United States Patent [19]

Janczak

[11] 4,341,017
[45] Jul. 27, 1982

[54] TREE-PRUNING AND CLEARING APPARATUS

[76] Inventor: Jerzy Janczak, S:t Mickelsgatan 71, S-126 54 Hägersten, Sweden

[21] Appl. No.: 259,781

[22] Filed: May 1, 1981

[30] Foreign Application Priority Data

May 14, 1980 [SE] Sweden .............................. 8003659

[51] Int. Cl.³ .................. B27B 17/02; B27B 17/08
[52] U.S. Cl. ................................. 30/381; 30/296 R; 30/384
[58] Field of Search ............... 30/381, 382, 383, 384, 30/386, 387, 296 R, 122, 228; 60/456; 173/168

[56] References Cited

U.S. PATENT DOCUMENTS

| | | |
|---|---|---|
| 2,474,706 | 6/1949 | Wahlmark ...................... 60/456 X |
| 2,748,810 | 6/1956 | Strunk ............................. 30/386 X |
| 3,213,605 | 10/1965 | Welden ............................... 30/228 |
| 3,266,534 | 8/1966 | Carnesecca ......................... 30/383 |
| 3,343,613 | 9/1967 | Carnesecca ..................... 30/381 X |
| 3,854,204 | 12/1974 | Gonzales ............................. 30/228 |

FOREIGN PATENT DOCUMENTS 2735617 2/1979 Fed. Rep. of Germany .
1478283 6/1977 United Kingdom .

Primary Examiner—Jimmy C. Peters
Attorney, Agent, or Firm—Sughrue, Mion, Zinn, Macpeak and Seas

[57] ABSTRACT

A pruning and clearing apparatus comprises a guide bar mounted on a handle. The saw chain of the guide bar is driven by means of a hydraulic motor and a separate portable drive unit comprising a hydraulic pump driven by an internal combustion engine and provided with an oil cooler. The hydraulic pump is connected to the hydraulic motor by lines arranged in the handle.

14 Claims, 8 Drawing Figures

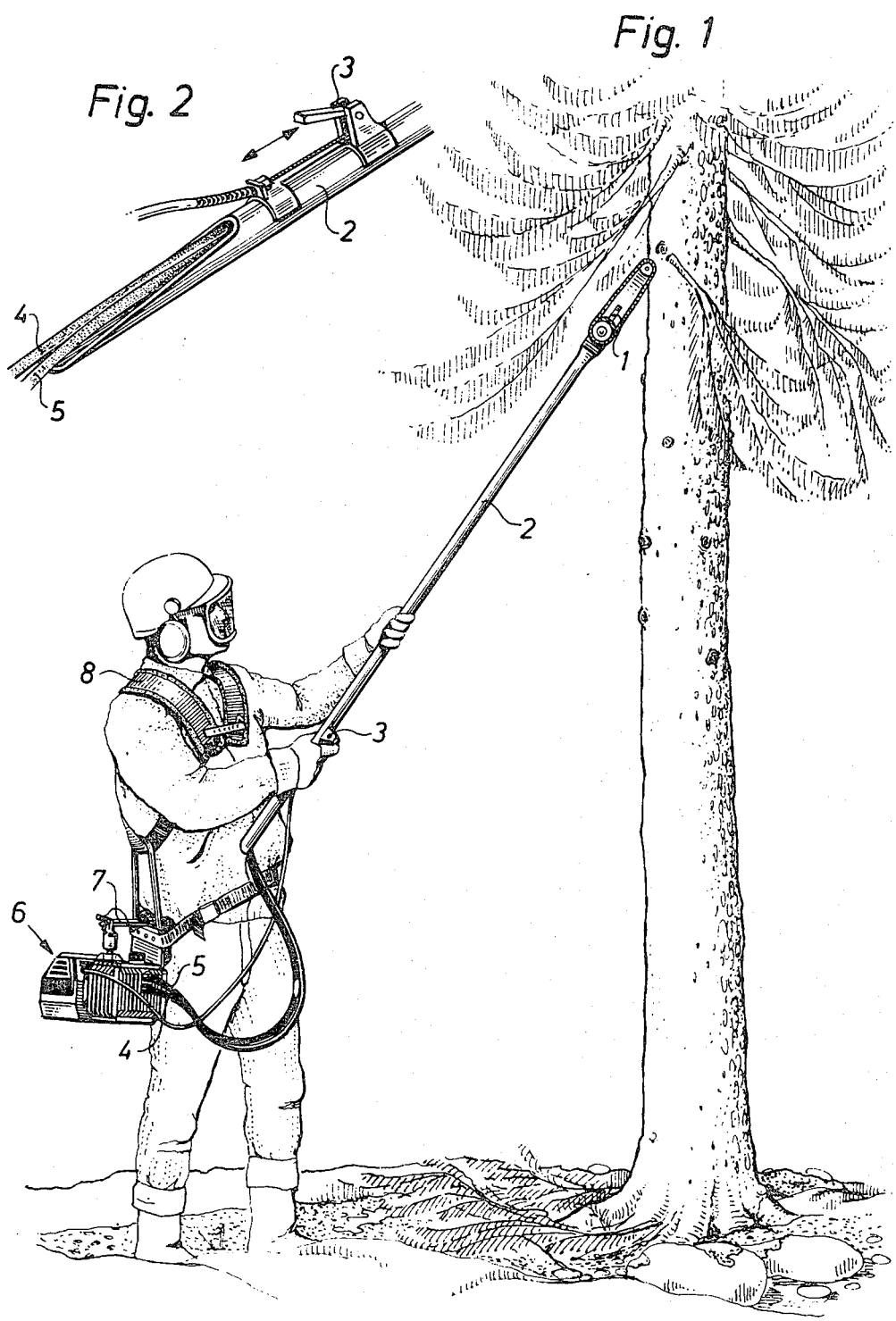

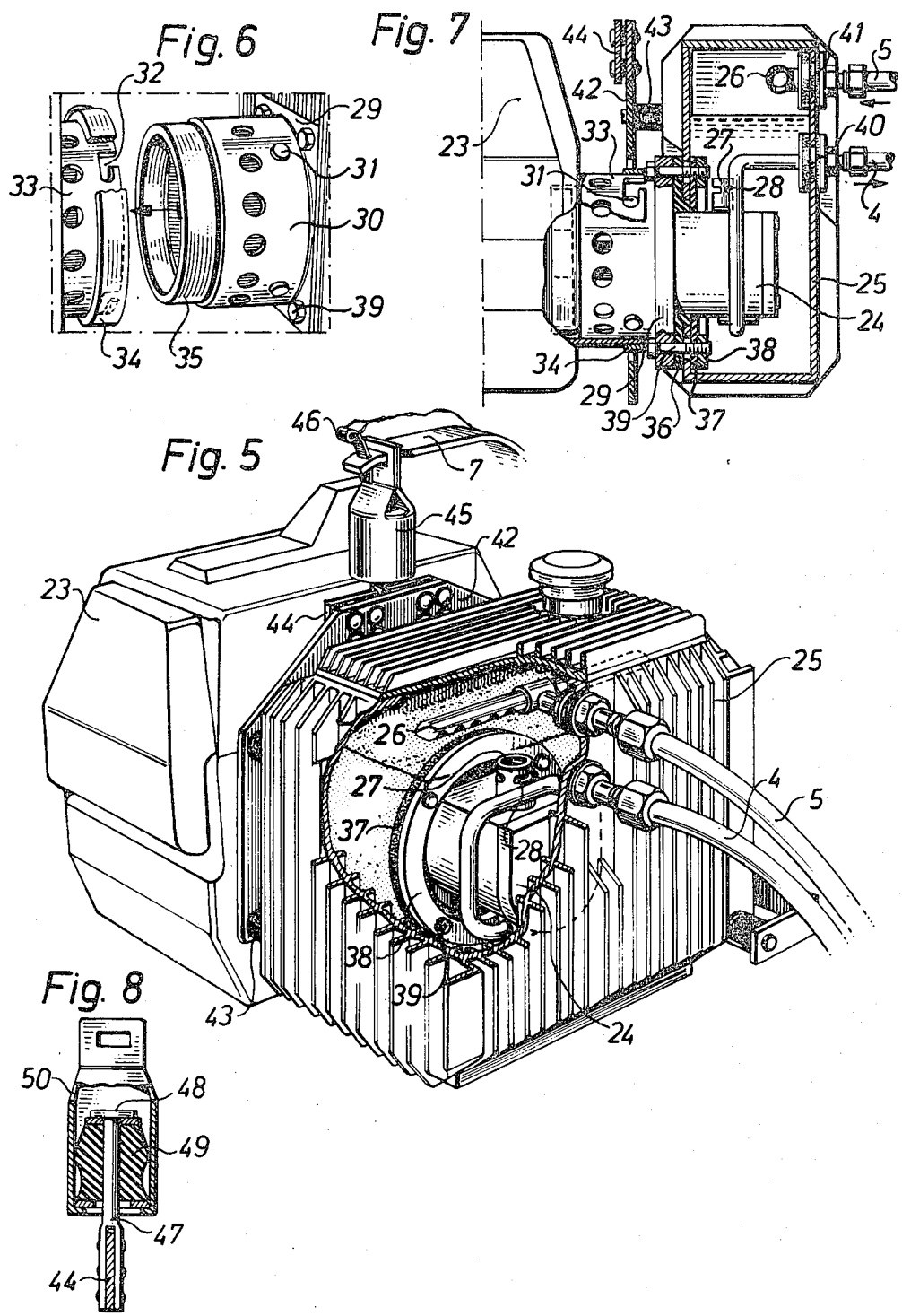

TREE-PRUNING AND CLEARING APPARATUS

The present invention relates to a saw equipment, particularly intended for simplifying and rendering more effective tree-pruning work, but which can also be used for tree-clearing, felling and cutting work.

The interest in pruning growing trees has greatly increased over recent years, because of the higher quality of wood obtained thereby. The apparatus hitherto available, however, has made pruning a relatively expensive operation and one which is difficult to carry out. Conventional equipment, such as pruning knives, handle-mounted pruning saws and pruning axes render the work time-consuming and tiresome, and makes it difficult to prune high branches. In this respect it has been proposed to use hydraulic or mechanical cutting tools. It is relatively difficult, however, to cut the branches as close to the trunk as one would desire when using these tools. The use of motor-driven circular saws mounted on a handle and of the kind used in brush saws has also been proposed. The disadvantage with a circular saw is that it is difficult to handle and to place the saw correctly relative to the trunk. Consequently, relatively long branch stubs are left. Self-climbing de-branching machines are also known to the art. These machines, however, are heavy and require two people to handle them.

The main object of the present invention is to provide an apparatus which, inter alia, can be used for pruning purposes, which is simple and easy to handle and which provides a good pruning result.

This object is achieved in accordance with the invention by using a handle-mounted guide bar in which the saw chain is driven from a separate drive unit. In order to obtain a tool which functions well in practice, it is necessary for both the guide bar and the drive unit to be very light in weight. Further, it is necessary to solve the problems of vibration.

For the purpose of reducing the tendency of the tool to kick-back it must be possible to make the nose radius of the guide bar very small, and, in order to render sawing effective and to reduce the risk of accidents occuring, it must be possible to drive the saw chain at very high speeds and with low moment of force.

A pruning and clearing equipment constructed in accordance with the invention and capable of satisfying the aforementioned requirements is characterized by the combination of a guide bar mounted on a handle and provided with a saw chain driven by a hydraulic motor, and a separate, portable hydraulic pump driven by an internal combustion engine and provided with an oil cooler, said pump being connected to the hydraulic motor via lines arranged in said handle.

The guide bar is suitably of the kind which includes an intermediate plate enclosed by two side plates which form a groove for the saw chain. To permit the saw chain to be driven at high speeds and to provide a guide bar which has a small nose radius, the guide bar is provided with a nose roller having a groove for the chain, said roller being freely rotatably mounted between the side plates, whereat at least one lubricating-oil channel arranged in the guide bar discharges adjacent the bearings of the nose roller. Preferably, that part of said channel which extends up to the nose roller has the form of a groove located in the intermediate plate, while the channel extending from the periphery of the roller to the bearings thereof is formed by a groove in at least one of the side plates. To permit oil to be effectively supplied to the bearing, said groove in at least one of the side plates is slightly curved in the direction of rotation of the roller.

In a preferred embodiment of the invention, the hydraulic pump is arranged in the oil cooler, whereat the internal combustion engine is suitably arranged to be mounted directly onto the hydraulic pump, which is suspended in a non-vibratory manner on a wall of the oil cooler. To enable the oil cooler with the hydraulic pump and the internal combustion engine to be supported in a support harness, a suspension plate is suitably mounted on the oil cooler in a manner such as to be vibration free. In turn, the plate may be connected to a rubber vibration-absorbing device arranged to be hung on a support arm of the harness.

In order to effectively cool the oil, and thus reduce the amount of oil required to a minimum, means are suitably provided by which return oil from the hydraulic motor can be sprayed onto an inner wall of the oil cooler, said inner wall being provided with heat-absorbing fins. In this respect, the pump inlet is suitably so arranged that return oil from the hydraulic motor must circulate within the oil cooler before it reaches said inlet.

Thus, in accordance with the invention there is provided an extremely light guide bar which is smooth and effective in operation, which will not kick-back and which can be manoeuvered readily and safely by means of a handle, in both vertical and horizontal sawing directions; and in which the drive unit to be carried by the operator in a harness can be combined into a compact and light unit, among other reasons because the apparatus requires only a relatively small amount of oil, and which unit can be made substantially free of all vibrations.

The invention will now be described in more detail with reference to the accompanying drawings.

FIG. 1 illustrates the use of a saw according to the invention for pruning or de-limbing a tree.

FIG. 2 illustrates the rear part of the handle of the saw illustrated in FIG. 1.

FIG. 5 illustrates the drive unit for the saw according to the invention, with part of the wall of the oil cooler cut away.

FIGS. 6 and 7 illustrate the manner in which the combustion engine, hydraulic pump and oil cooler are coupled together.

FIG. 8 is a sectional view of a rubber vibration-damping device for suspending the unit illustrated in FIG. 5 in a harness.

Figure 3:
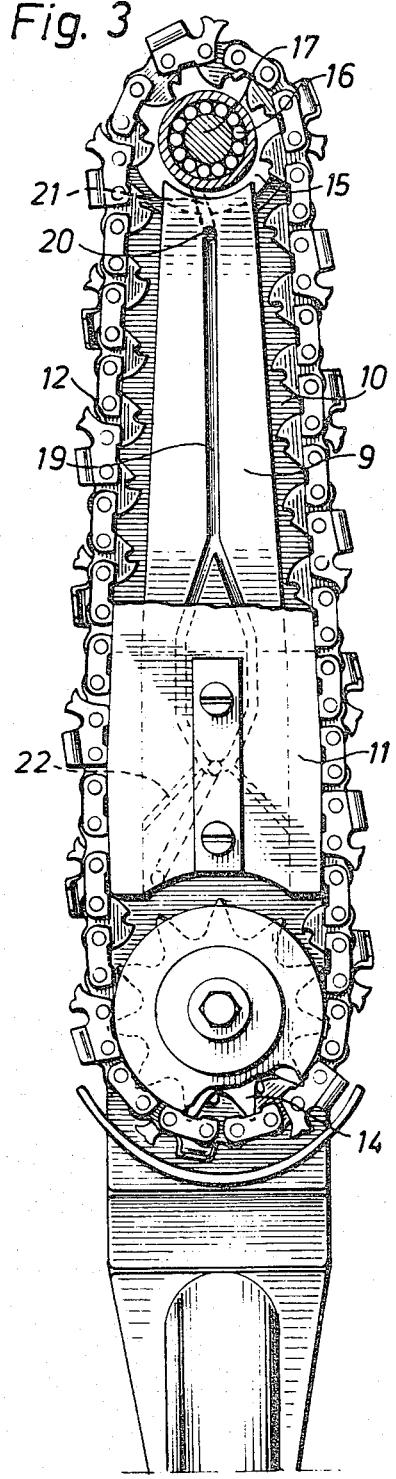
FIG. 3 illustrates the guide bar with parts of one side plate removed.

In FIG. 1 the reference 1 identifies a small and light guide bar which can be driven at high speeds and which, for the purpose of minimizing the tendency of the guide bar to kick-back, has a small nose radius. Because the chain is driven at high speeds, the moment of force may be low, which greatly reduces the risk of accidents occurring. The high speed at which the chain is driven also enables thin branches of trees and shrubs to be severed without tearing or breaking the branches, therewith, among other things, eliminating damage to the stem of the tree. The guide bar 1 is mounted on one end of a handle 2 provided with a throttle trigger 3 which can be moved along the handle. The handle 2 is suitably made of aluminium or a fibre-reinforced plastics material. Extending in the handle are two lines 4 and 5 for the supply of hydraulic oil to a hydraulic motor mounted on the guide bar, and for conducting return oil from said hydraulic motor respectively. The lines 4 and 5 are connected to a drive unit 6 carried on a support arm 7 of a harness 8 which is carried by the operator. Because the drive unit 6 is only suspended at one location, it can be swung to different positions so as not to obstruct the operator in his work. This enables the de-vibration to be made very effective, as described hereinafter.

To enable both high and low branches to be cut relatively easily, the throttle trigger 3 can be moved along the handle 2, and the rear end of the handle is slotted, as shown in FIG. 2. This enables the handle to be moved back when cutting low branches, without requiring extra long lines, while the whole length of the handle can be used when cutting high branches.

Figure 4:
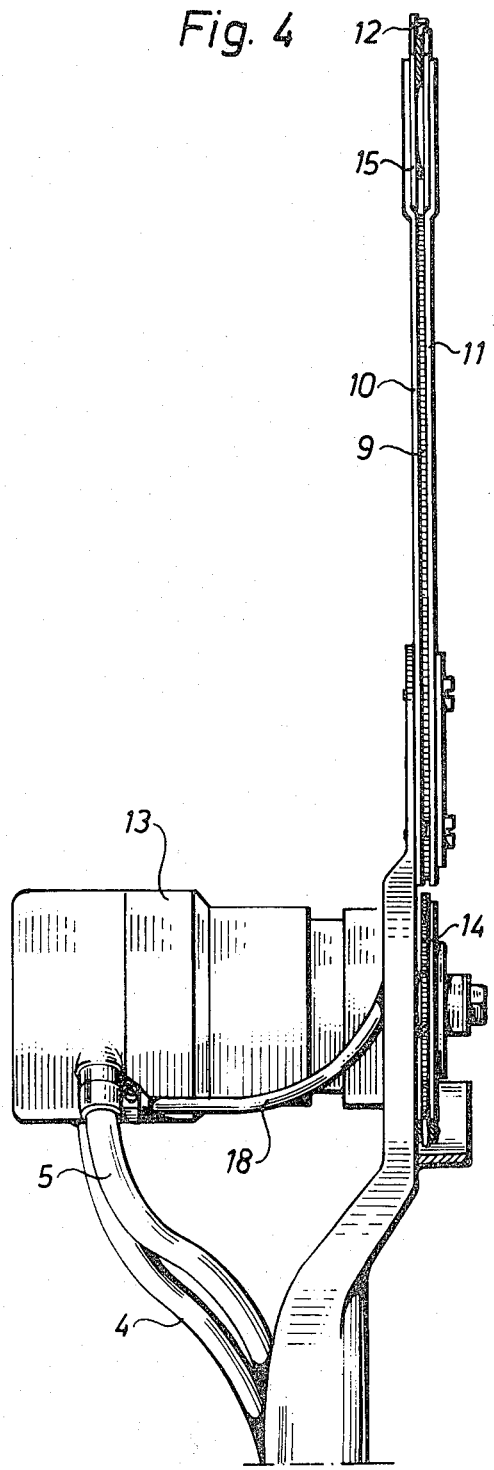
FIG. 4 illustrates the guide bar of FIG. 3 seen from one side, whereat parts of the saw chain have been removed.

FIGS. 3 and 4 illustrate the guide bar 1 shown in FIG. 1 in larger scale. The guide bar is of the kind which comprises an intermediate plate 9 enclosed by two side plates 10 and 11, the side plates extending beyond the intermediate plate to form a groove for guiding the chain 12. The chain is driven by means of a hydraulic motor 13 via a sprocket wheel 14. Light hydraulic motors suitable for this purpose are available on the market.

To reduce the kick-back tendency of the guide bar, the guide bar has a smaller nose radius than conventional guide bars. Because of this it is not possible to use conventional sprocket nose wheels such as those used with known guide bars, since the sprocket wheel and/or the bearings thereof would be much too weak.

In accordance with the invention there is used instead a nose pulley or roller 15 having two flanges and an intermediate groove for guiding the saw chain 12. Such a roller has the important advantage over sprocket wheels that no material need be removed to form the spaces between the teeth. The nose roller is journalled by means of rollers 16 around a fixed shaft 17 mounted on the side plate. In the region of the nose roller 15, the side plates are widened to provide room for the roller 15.

In order to enable the chain to be driven at high speeds, so as to reduce the moment of force and therewith the risk of accidents occurring, the bearing 16 must be actively lubricated. This is effected in accordance with the invention by supplying oil from the line 5, via a line 18, into a channel arranged in the guide bar, said channel being partially formed by a groove 19 in the intermediate plate 9. Arranged in the forward end of the intermediate plate is a hole 20 at the end of the groove 19, through which hole oil is forced out to both sides of the roller 15. For conveying the oil further to the bearing 16 there are provided curved channels formed by grooves in the outer plates 10 and 11. As a result of the illustrated curvature of groove 21, there is obtained a pumping action which ensures continuous supply of oil to the bearing. The outer plates, however, are suitably provided with small drainage holes so that supply of oil to the bearing can be controlled. The plates 10 and 11 are mutually identical and are provided with identical grooves 21. When the plates are assembled, however, the grooves are swung in different directions, whereat effective lubrication of the bearing 16 is obtained irrespective of how the guide bar is turned when being assembled. If so required, separate grooves 21 may be arranged in the intermediate plate 9 so that lubricating oil can also be passed directly to the saw chain 12. Effective cleaning of the groove in the roller 15 is obtained by the fact that the intermediate plate 9 projects into said groove. Thus there is no risk of the groove becoming blocked.

FIG. 5 illustrates the drive unit for the saw arrangement according to the invention, said drive unit being arranged to be hung on the carrier arm 7 of the harness worn by the operator. The drive unit comprises an internal combustion engine 23 conventional in motor saws, said engine being connected to a hydraulic pump 24 arranged in an oil cooler 25. In order to effectively cool the hydraulic oil, and therewith minimize the amount of oil required, the return oil entering the cooler via line 5, is sprayed through a spray pipe 26 onto one of the walls of the oil cooler 25, said wall being provided with heat-absorbing fins. The return oil is then passed down along the wall and the bottom of the cooler, and flows up along the opposite wall to an inlet 27 located on the upper side of the hydraulic pump. Beneath the mouth of the inlet pipe is arranged a small hole 28, which enables enough oil to lubricate the hydraulic pump 24 to be supplied thereto even when the oil level is low. This quantity is, however, insufficient to drive the saw chain. In this way, the operator obtains an indication that the oil level is low, before there is a risk of the hydraulic pump and chain and guide bar being damaged.

As the illustrated oil cooler has both inner and outer fins, of which the inner fins have a rough surface while the outer fins have a very smooth surface, and as the return oil is dispersed over a wall of the cooler the oil is cooled very effectively. The cooling air of the engine may also be used to improve air circulation around the cooler. Practical tests have shown that the volumetric capacity of the cooler of the saw equipment according to the invention having a pump capacity of 10–15 l/min. can be less than 2 liters, for example as small as 1.3–1.5 liters. According to conventional calculation practice, the volume of oil with continuous hydraulic operation should be 2.5 times the pump capacity in liters/min. A capacity of 10–15 l/min. would thus require an oil volume of about 25–35 liters. Although the saw is not driven continuously when de-limbing or pruning, the minimum volume obtained in accordance to the invention is still surprisingly small and constitutes a condition for being able to use a hydraulically driven saw according to the invention in practice. An important contribution to the effective cooling of the oil is obtained by means of the shaft which further becomes warm during use, which is a great advantage when working during the winter.

For the purpose of eliminating the vibrations from the combustion engine 23, the unit is constructed in the manner more clearly shown in FIGS. 6 and 7. In FIGS. 6 and 7 the reference 29 identifies a flange which is either connected to the hydraulic pump 24 or built together therewith, and which is provided with a cylindrical collar 30. The collar 30 is provided with pegs 31 arranged to co-act with slots 32 in a collar 33 fixedly mounted on the combustion engine 23, to provide a bayonet-type lock for securing the combustion engine to the hydraulic pump. The reference 34 identifies a locking ring. The hydraulic pump 24 is provided with a clutch drum 35 which is connected to the drive shaft of the pump and which is driven by centrifugal clutch incorporated in the combustion motor and being of the kind normally used in motor saws. The combustion engine 23 is thus directly suspended on the hydraulic pump 24 and, as a result of the mutual co-action between the collars 30 and 33, will be exactly centered relative to the hydraulic pump drive shaft.

In turn, the hydraulic pump 24 is suspended on a wall of the oil cooler 25 in a manner to eliminate vibrations, to which end a rubber packing 36 is arranged between the flange 29 and said wall, while a further rubber packing 37 is arranged between an inner mounting ring 38 and said wall, said mounting ring being provided with screw-threaded holes. The flange 29 and the ring 38 are drawn together by means of bolts 39, while compressing the rubber packing 36 and 37. The bolts 39 pass through wide holes in the wall of the oil cooler. Thus, there is no metallic contact between the engine or the hydraulic pump and the oil cooler. For the same reason, the hydraulic lines 4 and 5 are also provided with similar vibration damping rubber bushes 40 and 41 respectively.

To enable the drive unit to be hung from the harness 8 worn by the operator, a suspension plate 42 is fastened on one wall of the oil cooler by means of bolts provided with rubber bushes 43. Thus, there is no metallic contact between the plate 42 and the oil cooler. The plate 42 also acts as a heat shield between combustion engine and oil cooler. In the illustrated embodiment, an attachment plate 44 is mounted adjacent the plate 42 in a manner such as to eliminate vibrations. As will be seen from FIG. 5, the plate 44 is provided with suspension means 45 arranged to be passed over the carrier arm 7 of the harness 8 and to be locked by means of a pin 46. Thus, the whole unit can be readily attached to the harness and removed therefrom with the use of only one hand, which, inter alia, enables the operator to rapidly remove the drive unit in an emergency.

FIG. 8 is a part sectional view of the suspension means 45, which comprises a carrier rod 47 riveted to the plate 44 and having an upper flange 48 which rests on a rubber pad 49. Thus, metallic contact between the carrier rod 47 and the sleeve 50 from which the carrier rod 47 hangs is also prevented.

In the foregoing there has been described a preferred embodiment of saw equipment for pruning or de-limbing trees. The various elements of the saw equipment, however, may vary in many respects within the scope of the invention. In addition to pruning or de-limbing the saw equipment according to the invention can also be used to advantage for brushing work, which work is sometimes an absolute necessity to enable pruning work to be effective, when the vegetation is so dense that the branches to be lopped cannot be reached until the brush is cleared. Saw equipment according to the invention can also be used to great advantage for felling and bucking work, with a drive unit separate from the saw. The advantages gained include the relatively light weight of the saw equipment and the fact that vibrations are at least extremely low. Thus, the invention enables the same equipment to be used for a plurality of different working operations.

What is claimed is:

1. A saw equipment, especially for pruning of trees and clearing work, comprising a guide bar mounted on a handle and provided with a saw chain driven by a hydraulic motor arranged at the end of the handle, a portable hydraulic pump separated from the handle and directly driven by an internal combustion engine coupled to the hydraulic pump such that the flow discharged from the pump and supplied to the hydraulic motor is controlled solely by the speed of the engine, and an oil cooler receiving return oil from the hydraulic motor and from which cooler oil is supplied to the hydraulic pump, said hydraulic motor being connected to the hydraulic pump and the oil cooler, respectively, via hydraulic lines arranged in the handle.

2. A saw equipment, especially for pruning of trees and clearing work, comprising a combination of a guide bar mounted on a handle and provided with a saw chain driven by a hydraulic motor, and a separate, portable hydraulic pump driven by an internal combustion engine and having an oil cooler, said pump being connected to the hydraulic motor via lines arranged in the handle, wherein the guide bar comprises an intermediate plate enclosed by two side plates which form a groove for the chain, a nose roller having a groove for accommodating the chain freely rotatably journalled between the side plates at a free end of the guide bar; and at least one channel arranged in the guide bar for lubricating oil discharges at bearings of the nose roller, wherein a part of said channel extending up to the nose roller has the form of a groove in the intermediate plate; and a part of the channel extending from the periphery of the roller to the bearings thereof is formed by a groove arranged in at least one side plate.

3. A saw equipment, especially for pruning of trees and clearing work, comprising a combination of a guide bar mounted on a handle and provided with a saw chain driven by a hydraulic motor, and a separate, portable hydraulic pump driven by an internal combustion engine and having an oil cooler, said pump being connected to the hydraulic motor via lines arranged in the handle, wherein the hydraulic pump is arranged in the oil cooler; and the internal combustion engine is arranged to be mounted directly on the hydraulic pump which is suspended on a wall of the oil cooler in a vibrationless manner, wherein a suspension plate is mounted on the oil cooler in a substantially vibrationless manner for suspending the oil cooler with the hydraulic pump and the combustion engine in a support harness, and wherein the suspension plate is connected to a rubber vibration-damping means arranged to be hung on a carrier arm of the harness.

4. A saw equipment, especially for pruning of trees and clearing work, comprising a combination of a guide bar mounted on a handle and provided with a saw chain driven by a hydraulic motor, and a separate, portable hydraulic pump driven by an internal combustion engine and having an oil cooler, said pump being connected to the hydraulic motor via lines arranged in the handle, and means for spraying return oil from the hydraulic motor onto an inner wall of the oil cooler, said inner wall being provided with heat-absorbing fins.

5. An equipment according to claim 1, 3 or 4, wherein the guide bar comprises an intermediate plate enclosed by two side plates which form a groove for the chain, a nose roller having a groove for accommodating the chain is freely rotatably journalled between the side plates at the free end of the guide bar; and at least one channel arranged in the guide bar for lubricating oil discharges at the bearings of the nose roller.

6. An apparatus according to claim 5, wherein the part of said channel extending up to the nose roller has the form of a groove in the intermediate plate; and the part of the channel extending from the periphery of the roller to the bearings thereof is formed by a groove arranged in at least one side plate.

7. An equipment according to claim 6, wherein said groove in at least one side plate is slightly curved in the direction of rotation of the roller.

8. An equipment according to claim 1, 2, 3 or 4, wherein the throttle trigger of the internal combustion engine is displaceable along the handle.

9. An apparatus according to claim 1, 2 or 3, wherein the hydraulic pump is arranged in the oil cooler; and the internal combustion engine is arranged to be mounted directly on the hydraulic pump which is suspended on a wall of the oil cooler in a vibrationless manner.

10. An apparatus according to claim 9, wherein for the purpose of suspending the oil cooler with the hydraulic pump and the combustion engine in a support harness there is provided a suspension plate which is mounted on the oil cooler in a substantially vibrationless manner.

11. An apparatus according to claim 10, wherein the suspension plate is connected to a rubber vibration-damping means arranged to be hung on a carrier arm of the harness.

12. An apparatus according to claim 1, 2 or 3 comprising means for spraying return oil from the hydraulic motor onto one of the inner walls of the oil coolers, said inner wall being provided with heat-absorbing fins.

13. An apparatus according to claim 12, wherein the inlet of the hydraulic pump is so arranged that return oil from the hydraulic motor must circulate in the oil cooler before reaching the inlet; and said inlet is arranged to constantly supply a sufficient amount of oil to the pump for the lubrication thereof.

14. A saw equipment according to claim 1, wherein the internal combustion engine is arranged to be coupled to the hydraulic pump through a speed controlled coupling allowing the pump to be driven intermittently.

* * * * *